United States Patent Office 3,031,328
Patented Apr. 24, 1962

3,031,328
METHOD AND COMPOSITION FOR WATER-RESISTANT RECORDING MATERIAL
George H. Larsen, Belmont, Mass., assignor to Ludlow Corporation, a corporation of Massachusetts
No Drawing. Filed Nov. 12, 1959, Ser. No. 852,215
2 Claims. (Cl. 117—36.7)

This invention relates to a sheet material adapted to accept markings from a stylus. The sheet material is preferably paper, although any other sheet material having sufficient strength such as cellophane, synthetic plastics and the like may also be employed. The impression-receiving characteristics of the sheet material are provided by a coating on its face, which coating is in the form of a blushed opaque film and which is adapted to be rendered locally transparent by means of a stylus. The transparentizing of the film coating may be achieved by physical pressure exerted on the face of the film by the stylus or by heat radiated from a heated stylus which is slightly spaced from the film or by a combination of heat and pressure.

The backing sheet is of a color which contrasts with the color of the opaque film coating so that the transparent area through which the color of the backing shows provides a suitable contrast with the remainder of the opaque coating. Such recording material is useful in the production of inkless recording charts for use on recording instruments in which the stylus may or may not be heated.

It has long been known that recording material of the general type described may be prepared by providing a suitable lacquer containing a film-forming resinous material, to which lacquer sufficient water is added to cause the solution to blush when it is coated on the backing and dried. However, when the conventional procedure is employed, it is found that the resultant recording material is not water resistant, as is required or desirable for many applications, and that the dry blushed lacquer coating is rendered temporarily locally transparent by the application of moisture or water as well as by the action of the stylus.

One object of the present invention is to provide a method and composition for making water-resistant recording material.

Another object is to provide a composition in the form of a clear, transparent, homogeneous solution adapted to be coated on paper or other suitable backing and dried by evaporation to produce a blushed opaque film which can be rendered locally transparent by a stylus.

In accordance with the present invention, there is prepared a solution of a resin such as a water-insoluble, film-forming, thermoplastic, polymeric material in a mixture of a volatile organic solvent and a volatile non-solvent liquid which has an evaporation rate substantially less than that of the solvent. The clear homogeneous solution is then coated on suitable backing material, preferably paper, and dried by evaporation to produce an opaque blushed film which is adapted to be rendered locally transparent by a stylus.

A simplified flow diagram of a preferred embodiment of the process is as follows:

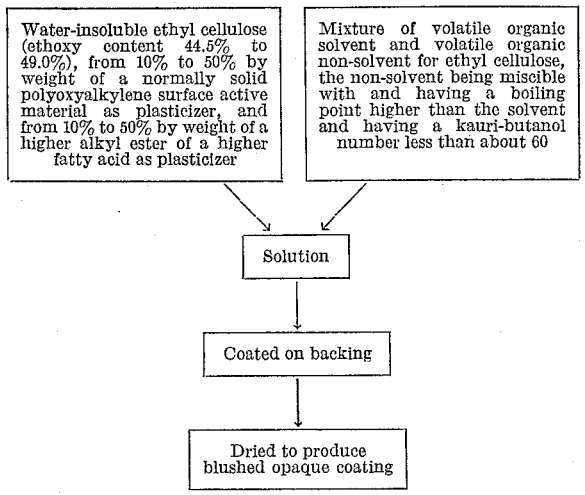

The resin employed in the present invention may be any one of a wide variety of water-insoluble, thermoplastic, film-forming, polymeric materials. Those materials commonly used in making lacquers are particularly desirable. Among suitable materials are various cellulose derivatives, including nitrocellulose, cellulose esters such as cellulose acetate or cellulose acetate-butyrate, cellulose ethers such as ethyl cellulose, vinyl polymers such as copolymers of vinyl chloride and vinyl acetate, acrylic and methacrylic polymers such as polymethylmethacrylate, polyethylmethacrylate, and many other materials of this nature well known to those skilled in the art. Ethyl cellulose is the material of choice when the recording sheet is to be used in pressure contact with a stylus, particularly a heated stylus, because it displays markedly less tendency to cling to and form an adherent mass upon the stylus point than do many other resins. Such an adherent mass, of course, interferes with proper functioning of the stylus and leads to blurred markings.

The ethyl cellulose preferred for use in the present invention is a water-insoluble material which preferably has an ethoxy content from 44.5% to 49.0% by weight. Ethyl cellulose materials having lower ethoxy contents possess water solubilities which become increasingly large as the ethoxy content is reduced, while if the ethoxy content is above 49.0%, it becomes increasingly difficult to cause a solution prepared in accordance with the present invention to blush upon drying. The cellulose acetate which is preferred for best results contains from 52.0% to 59.0% by weight of combined acetic acid.

A wide variety of volatile liquid organic solvents are suitable for use in the present invention, among which are chloroform, ethylene dichloride, trichloroethylene dioxide, methyl acetate, ethyl acetate, acetone, benzene, isopropyl acetate, and the like, as well as mixtures of these materials with each other. In the case of certain solvents such as benzene and isopropyl acetate which tend to form gels with certain resins such as ethyl cellulose, it is desirable to employ also a small amount of ethyl alcohol to provide a clear, free-flowing solution. It is essential that the solvent have a higher evaporation rate than the non-solvent liquid with which it is mixed, and so it is desirable that the solvent, as a practical matter, have a relatively low boiling point, i. e., below about 200° C., preferably below 100° C.

The volatile non-solvent liquid, in which the resin is substantially insoluble at room temperature, must possess an evaporation rate lower than the evaporation rate of the solvent, so that as the solution is dried the solvent will evaporate first, causing the relative proportion of non-solvent present in the mixed solution to increase during the drying of the solution by evaporation. For most practical purposes, it is found that evaporation rates are roughly inversely proportional to the boiling points of the liquids used. Accordingly, a non-solvent liquid having a boiling point substantially higher than that of the solvent will be effective for the purpose of the present invention. Usually the non-solvent liquid should have a boiling point at least 10° C. higher than the boiling point of the solvent. The non-solvent may boil over a relatively wide range of temperatures (as may the solvent or solvent mixture), but a major proportion of the non-solvent should boil above the maximum boiling range of the solvent. The non-solvent liquid must be miscible with the solvent so that a transparent, homogeneous, free-flowing solution of the resin in the mixture of solvent and non-solvent can be prepared. The non-solvent liquids which have been found particularly useful in the present invention are petroleum fractions, particularly aliphatic hydrocarbon liquids, aromatic hydrocarbon liquids such as toluene, xylene, etc., alcohols such as butyl alcohol, 2-ethoxyethanol, etc., esters such as butyl acetate, butyl lactate, 2-ethoxyethyl acetate, etc. The choice of the particular non-solvent liquid will depend of course upon the identity of the resin selected. A liquid which is a non-solvent for one resin may be a good solvent for another resin, as is well known. The hydrocarbon liquid non-solvents whch have a kauri-butanol number less than about 60 are particularly preferred for use with ethyl cellulose lacquers because of their very low solvent power for this material. Hexane can be used as a non-solvent when the solvent is sufficiently low boiling, such as methyl acetate or acetone. Other suitable non-solvent hydrocarbons are sold under such names as naphtha, naphthol spirits, textile spirits, rubber solvent, and the like.

The relative proportions of resin and volatile organic solvent are not critical. The concentration of the ethyl cellulose must be kept sufficiently low so that the viscosity of the solution is in the proper range for ease of coating, but subject to this limitation should obviously be as high as possible in order to minimize the cost of the solvent and to provide a blushed coating sufficiently thick to mask the underlying backing sheet. The relative proportion of solvent and non-solvent will obviously vary depending upon the identities of the particular solvent and non-solvent used, as well as upon the identity and concentration of the resin present. It is essential, of course, that sufficient non-solvent liquid be present so that the desired blushed opaque film results upon drying of the solution. This usually requires that the amount of non-solvent liquid be at least 10% by weight of the solvent and can readily be determined exactly in any particular case by a simple test. The minimum required may vary depending on the nature of the backing material. It is desirable in most cases to employ somewhat more than the minimum quantity of non-solvent liquid required to produce a blushed coating, but excessively large proportions of non-solvent, sufficient to cause turbidity of the solution or precipitation of the ethyl cellulose must be avoided because coatings produced from such turbid nonhomogeneous solutions do not possess the desired water resistance. In most combinations of solvent and non-solvent, there is considerable latitude in the amount of non-solvent which may be present between the minimum required to obtain a blushed opaque coating and the amount which produces turbidity of the solution. It is desirable to employ substantially less of the non-solvent than is required to produce turbidity and to keep the quantity of non-solvent closer to the minimum than to the maximum in order to produce a finished product having maximum water resistance.

It has also been found desirable in many cases to incorporate in the solution a water-insoluble plasticizer or softening agent for the resin in order to provide a finished product having maximum sensitivity to the pressure or heat of the stylus. A wide variety of suitable plasticizers for such resinous compositions is well known and commonly available. These plasticizing materials not only provide improved sensitivity to heat and/or pressure of the stylus, but also in many cases provide improved whiteness of the blushed opaque coating and better adhesion of the coating to the paper or other backing material. It is usually desirable to employ relatively small proportions of such plasticizing materials, of the order of 10% to 50% by weight of the resin, since increasing the quantity of such plasticizers usually tends to have an adverse effect upon the development of the blush and opaqueness of the coating.

While water-insoluble plasticizing materials are preferred for the most part, best results and maximum sensitivity of the finished recording material have been achieved when ethyl cellulose is the resin by using as plasticizers limited quantities, of the order of 10% to 50% by weight of the ethyl cellulose, of polyoxyalkylene compounds, particularly polyoxyethylene compounds, even though most such materials are generally considered to be surface active agents and to be water soluble. Particularly good results are obtained if there is employed along with the polyoxyalkylene compound an amount of a higher alkyl ester of a higher fatty acid in the same range of proportions, i.e., from 10% to 50% by weight of the ethyl cellulose, preferably in an amount approximately equal to the amount of polyoxyalkylene compound. Among the polyoxyalkylene compounds which are effective plasticizers for ethyl cellulose for the purpose of the present invention are the nonionic surface active agents such as alkyl phenyl polyethylene glycol ethers; the partial esters of ricinoleic acid with polyalkylene glycols; the polyoxyalkyene condensation products of partial esters of hexitols, such as sorbitan, with higher fatty acids such as lauric, palmitic or stearic; as well as polyalkylene glycols, e.g., polyethylene glycol or polypropylene glycol. All of these materials preferably have from 5 to 200 alkylene oxide units in each molecule, the preferred materials being normally solid at room temperature.

In order to ensure maximum water resistance of the finished recording material, it is desirable, when one of the foregoing polyoxyalkylene compounds is employed as a plasticizer, to have present in the composition, as pointed out above, an approximately equal quantity of a higher alkyl ester of a higher fatty acid. Among suitable esters are those of alcohols having from 10 to 22 carbon atoms with fatty acids, preferably saturated fatty acids, having from 16 to 24 carbon atoms, among which are dodecyl stearate, tetradecyl palmitate, cetyl stearate, the decyl ester of behenic acid, stearyl oleate, dodecyl ricinoleate, etc.

The solution may be coated on the backing sheet in any conventional manner, as for example by means of a reverse roll coater or a knife coater. The backing sheet, which may be either transparent or opaque, may be composed of a suitable synthetic plastic composition such as a polyester film, nylon film, or a film of polypropylene or glassine as well as paper, must, of course, be restraint to the mixture of solvent and non-solvent employed to dissolve the ethyl cellulose. The material of choice is paper. The paper backing sheet is desirably printed or otherwise provided with a suitable coloring agent to present a surface contrasting in color to that of the opaque ethyl cellulose coating so that local transparentizing of the finished coating will provide a localized zone the color of which contrasts with that of the remainder of the coating. While it is possible to add a suitable coloring material to the solution of resin in order to provide a blushed opaque coating of any desired hue, it is normally preferred to omit any color so that the finished coating approaches white in its color.

The backing sheet, having been coated with a resin solution or blushing lacquer prepared in accordance with the present invention, may be dried in any conventional manner either at room temperature or at elevated temperature to evaporate the solvent and non-solvent to provide the opaque blushed film.

The following specific examples are intended to illustrate more fully the nature of the invention, but are not intended to act as a limitation upon the scope thereof.

Example 1

A solution was prepared having the following composition, in which the parts are by weight:

| | Parts |
|---|---|
| Nitrocellulose (R.S. 5–6 sec., 11.2%–12.2% nitrogen) | 10.0 |
| Acetone | 20.0 |
| Ethyl acetate | 30.0 |
| Super naphtholite (aliphatic hydrocarbon, B.P. 119.5°–143.3°, kauri-butanol No.=33.8) | 22.2 |

The solution, in the form of a water-clear transparent liquid of medium viscosity, was coated on black coated paper and allowed to dry at room temperature. The product carried a blushed, opaque, greyish-white film which obscured the underlying black coating. Moderate pressure of a stylus on the face of the opaque coating caused the coating to become locally transparent to permit the black undercoatings to show through and leave a visible trace. Similarly, a heated stylus, when passed across the coated face of the paper in close proximity thereto but not in actual contact therewith, caused local transparentizing and left a visible trace. The product was stable and non-blocking under the usual conditions of storage. In contrast to the behavior of recording material prepared from a water-containing blushing lacquer made with nitrocellulose, the product prepared as described above was not marked or rendered transparent by the application of a drop of water to the coated face.

Example 2

Recording material was prepared as described in Example 1 except that the coating solution had the following composition:

| | Parts |
|---|---|
| Copolymer of vinyl chloride and vinyl acetate (91:9), partially hydrolyzed to give 6% vinyl alcohol content | 16.0 |
| Acetone | 50.0 |
| Naphthol spirits (aliphatic hydrocarbon, B.P. 154.5°–170° C., K.B. No.=33.8) | 7.6 |
| Super naphtholite | 22.2 |

The product exhibited properties similar to those of the product of Example 1.

Example 3

Recording material was prepared as described in Example 1 except that the coating solution had the following composition:

| | Parts |
|---|---|
| Cellulose acetate (55% combined acetic acid) | 8.0 |
| Methanol | 10.0 |
| Acetone | 40.0 |
| Ethyl acetate | 26.5 |
| Isopropyl acetate | 4.0 |
| Super naphtholite | 11.5 |

The product exhibited properties similar to those of the product of Example 1.

Example 4

Recording material was prepared as described in Example 1 except that the coating solution had the following composition:

| | Parts |
|---|---|
| Cellulose acetate-butyrate (17% butyrate) | 8.0 |
| Acetone | 30.0 |
| Ethyl acetate | 20.0 |
| Super naphtholite | 19.0 |

The product exhibited properties similar to those of the product of Example 1.

Example 5

Recording material was prepared as described in Example 1 except that the coating solution had the following composition:

| | Parts |
|---|---|
| Polymethyl methacrylate | 10.0 |
| Acetone | 50.0 |
| Ethyl acetate | 20.0 |
| Naphthol spirits | 7.5 |
| Super naphtholite | 7.5 |

The product exhibited properties similar to those of the product of Example 1.

Example 6

Recording material was prepared as described in Example 1 except that the coating solution had the following composition:

| | Parts |
|---|---|
| Polyethyl methacrylate | 10.0 |
| Acetone | 50.0 |
| Ethyl acetate | 20.0 |
| Naphthol spirits | 7.5 |
| Super naptholite | 22.5 |

The product exhibited properties similar to those of the product of Example 1.

Example 7

Recording material was prepared as described in Example 1 except that the coating solution had the following composition:

| | Parts |
|---|---|
| Ethyl cellulose (47.5%–49% ethoxy content) | 10.0 |
| Acetone | 30.0 |
| Naphthol spirits | 30.0 |
| Super naphtholite | 7.0 |

The product exhibited properties similar to those of the product of Example 1.

Example 8

Recording material was prepared as described in Example 1 except that the coating solution had the following composition:

| | Parts |
|---|---|
| Ethyl cellulose (44.5%–45.5% ethoxy content) | 10.0 |
| Methyl acetate | 40.0 |
| VM&P naphtha (an aliphatic hydrocarbon, B.P. 117.8°–143.9° C. having a kauri-butanol No.=39.3) | 34.0 |

The product exhibited much the same properties as that of Example 1.

Example 9

Recording material was prepared as described in Example 1 except that the coating solution had the following composition:

| | Parts |
|---|---|
| Ethyl cellulose (45.5%–46.8% ethoxy content) | 10.0 |
| Ethyl acetate | 30.0 |
| Mintrol spirits (an aliphatic hydrocarbon, B.P. 313°–380° F. having a kauri-butanol No.=33.0) | 23.0 |

The product exhibited much the same properties as that of Example 1.

*Example 10*

Recording material was prepared as described in Example 1 except that the coating solution had the following composition:

| | Parts |
|---|---|
| Ethyl cellulose (44.5%–45.5% ethoxy content) | 13.0 |
| Methyl acetate | 40.0 |
| Acetone | 20.0 |
| Textile spirit (B.P. 145°–175° F., kauri-butanol No.=32.8) | 60.0 |

The product exhibited much the same properties as that of Example 1.

*Example 11*

Recording material was prepared as described in Example 1 except that the coating solution had the following composition:

| | Parts |
|---|---|
| Ethyl cellulose (45%–46.5% ethoxy content) | 8.0 |
| Chloroform | 50.0 |
| Naphthol spirits | 7.0 |
| Super naphtholite | 28.0 |

The product exhibited much the same properties as that of Example 1.

*Example 12*

Recording material was prepared as described in Example 1 except that the coating solution had the following composition:

| | Parts |
|---|---|
| Ethyl cellulose (45%–46.5% ethoxy content) | 8.0 |
| Dioxane | 50.0 |
| Naphthol spirits | 7.0 |
| Super naphtholite | 28.0 |

The product exhibited much the same properties as that of Example 1.

*Example 13*

Recording material was prepared as described in Example 1 except that the coating solution had the following composition:

| | Parts |
|---|---|
| Ethyl cellulose (45%–46.5% ethoxy content) | 8.0 |
| Trichlorethylene | 70.0 |
| Naphthol spirits | 7.0 |
| Super naphtholite | 14.0 |

The product exhibited much the same properties as that of Example 1.

*Example 14*

Recording material was prepared as described in Example 1 except that the coating solution had the following composition:

| | Parts |
|---|---|
| Ethyl cellulose (45%–46.5% ethoxy content) | 8.0 |
| Benzene | 50.0 |
| Ethyl alcohol | 4.0 |
| Naphthol spirits | 7.0 |
| Super naphtholite | 21.0 |

The product exhibited much the same properties as that of Example 1.

*Example 15*

Recording material was prepared as described in Example 1 except that the coating solution had the following composition:

| | Parts |
|---|---|
| Ethyl cellulose (45%–46.5 ethoxy content) | 10.0 |
| Methyl acetate | 30.0 |
| Acetone | 20.0 |
| Japan wax | 3.0 |
| Naphthol spirits | 23.0 |

The product was somewhat more sensitive to pressure and to heat than was the product of Example 1. Similarly good results were obtained when the amount of Japan wax was increased up to 5 parts by weight.

*Example 16*

Recording material was prepared as described in Example 1 except that the coating solution had the following composition:

| | Parts |
|---|---|
| Ethyl cellulose (45%–46.5% ethoxy content) | 10.0 |
| Methyl acetate | 30.0 |
| Acetone | 20.0 |
| Hercolyn (hydrogenated methyl ester of rosin) | 2.0 |
| VM&P naphtha | 30.0 |
| Naphthol spirits | 3.0 |

The product was somewhat more sensitive to pressure and to heat than was the product of Example 1.

*Example 17*

Recording material was prepared as described in Example 1 except that the coating solution had the following composition:

| | Parts |
|---|---|
| Ethyl cellulose (45%–46.5% ethoxy content) | 8.0 |
| Ethyl acetate | 15.0 |
| Acetone | 20.0 |
| Neville soft (coumarone-indene resin) | 2.0 |
| Naphthol spirits | 23.0 |

The product was somewhat more sensitive to pressure and to heat than was the product of Example 1.

*Example 18*

Recording material was prepared as described in Example 1 except that the coating solution had the following composition:

| | Parts |
|---|---|
| Ethyl cellulose (45%–46.5% ethoxy content) | 8.0 |
| Methyl acetate | 30.0 |
| Acetone | 20.0 |
| Tergitol XD (polyalkylene glycol ether) | 2.0 |
| Dodecyl stearate | 2.0 |
| Naphthol spirits | 7.6 |
| Super naphtholite | 23.0 |

The product was somewhat more sensitive to pressure and to heat than was the product of Example 1. Similarly good results were obtained when the amount of dodecyl stearate was decreased to one part by weight and when it was increased to three parts; good results were also obtained when the amounts of Tergitol and of dodecyl stearate were each increased to three parts by weight.

*Example 19*

Recording material was prepared as described in Example 1 except that the coating solution had the following composition:

| | Parts |
|---|---|
| Ethyl cellulose (45%–46.5% ethoxy content) | 8.0 |
| Methyl acetate | 30.0 |
| Acetone | 20.0 |
| Tergitol XD | 1.0 |
| Naphthol spirits | 7.6 |
| Super naphtholite | 23.0 |

The product was somewhat more sensitive to pressure and to heat than was the product of Example 1. Similarly good results were obtained when the quantity of Tergitol XD was increased up to as much as four parts by weight.

*Example 20*

Recording material was prepared as described in Example 1 except that the coating solution had the following composition:

| | Parts |
|---|---|
| Cellulose acetate (55% combined acetic acid) | 8.0 |
| Methanol | 10.0 |
| Acetone | 40.0 |
| Ethyl acetate | 20.0 |
| Xylene | 15.0 |

The product was similar to that of Example 1 in its properties.

*Example 21*

Recording material was prepared as described in Example 1 except that the coating solution had the following composition:

| | Parts |
|---|---|
| Copolymer of vinyl chloride with vinyl acetate (87:13) | 10.0 |
| Acetone | 40.0 |
| Butanol | 32.0 |

The product was similar to that of Example 1 in its properties.

*Example 22*

Recording material was prepared as described in Example 1 except that the coating solution had the following composition:

| | Parts |
|---|---|
| Nitrocellulose (11.2–12.2% nitrogen) | 20.0 |
| Acetone | 50.0 |
| Toluene | 68.8 |

The product was generally similar to that of Example 1.

*Example 23*

Recording material was prepared as described in Example 1 except that the coating solution had the following composition:

| | Parts |
|---|---|
| Cellulose acetate-butyrate (17% butyrate) | 10.0 |
| Acetone | 50.0 |
| Butanol | 48.0 |

The product was generally similar to that of Example 1.

*Example 24*

Recording material was prepared as described in Example 1 except that the coating solution had the following composition:

| | Parts |
|---|---|
| Copolymer of vinyl chloride with vinyl acetate (96:4) | 4.0 |
| Methyl ethyl ketone | 60.0 |
| Butanol | 12.0 |

In this example it was necessary to heat the methyl ethyl ketone to an elevated temperature in order to dissolve the copolymer.

The product was generally similar to that of Example 1.

It will be appreciated that the relative quantities of solvent and non-solvent in each of the foregoing examples may be varied to some extent without adversely affecting the product. However, in each case a great reduction in the quantity of non-solvent will prevent the development of a blush and will lead to the formation of a clear transparent film upon evaporation of the liquids. An increase in the amount of non-solvent will, if sufficiently large, result in precipitation of the ethyl cellulose and turbidity of the solution. A coating made from such a turbid solution lacks water resistance. Indeed, even though the amount of non-solvent has been increased to a point short of that producing turbidity, water-resistance of the product tends to be reduced as the amount of non-solvent is increased.

It will be understood that no chemical interaction occurs between the ingredients of the numerous specific examples given above. The phenomenon on which the success of the present invention depends is purely physical, although the reasons why a product made in accordance with the present invention is water-resistant while other products made with water-containing blushing lacquers are not water-resistant are not fully understood.

Although specific embodiments of the invention have been described herein, it is not intended to limit the invention solely thereto, but to include all of the obvious variations and modifications within the spirit and scope of the appended claims.

What is claimed is:

1. The method of making a water-resistant recording material for accepting markings from a stylus which comprises preparing a solution of water-insoluble ethyl cellulose having an ethoxy content from 44.5% to 49.0% in a mixture of a volatile organic solvent therefor and a volatile liquid organic non-solvent therefor miscible with said solvent and having a boiling point substantially higher than the boiling point of said solvent and having a kauri-butanol number less than about 60, said solution containing also a normally solid polyoxyalkylene surface active material as a plasticizer for said ethyl cellulose in an amount from 10% to 50% by weight thereof and from 10% to 50% by weight of said ethyl cellulose of higher alkyl ester of a higher fatty acid, coating said solution on a backing, and drying said coating by evaporation of said solvent and non-solvent to produce a blushed opaque film adapted to be rendered locally transparent by a stylus.

2. The method as defined in claim 1 in which said non-solvent has a boiling point at least 10° C. higher than said solvent and the amount of non-solvent is at least 10% by weight of said solvent and substantially less than the quantity required to render said solution turbid.

References Cited in the file of this patent

UNITED STATES PATENTS

| 2,306,525 | Cummings | Dec. 29, 1942 |
| 2,519,660 | James | Aug. 22, 1950 |
| 2,739,909 | Rosenthal | Mar. 27, 1956 |
| 2,927,039 | Vanderweel | Mar. 1, 1960 |
| 2,930,106 | Wrotnowski | Mar. 29, 1960 |

FOREIGN PATENTS

| 1,051,112 | Germany | Feb. 19, 1959 |